United States Patent [19]

Lee et al.

[11] Patent Number: 5,042,062
[45] Date of Patent: Aug. 20, 1991

[54] METHOD AND APPARATUS FOR PROVIDING REAL-TIME SWITCHING OF HIGH BANDWIDTH TRANSMISSION CHANNELS

[75] Inventors: Robert C. Lee, Glen Ellyn, Ill.; James M. Leighton, Marlboro, N.J.; Gerard P. O'Reilly, Manalapan, N.J.; Donald E. Smith, Colts Neck, N.J.

[73] Assignee: AT&T Bell Laboratories, Murray Hill, N.J.

[21] Appl. No.: 425,644

[22] Filed: Oct. 23, 1989

[51] Int. Cl.$^5$ .............................................. H04M 11/00
[52] U.S. Cl. ...................................... 379/54; 379/53; 379/94; 379/219; 370/58.2; 358/85
[58] Field of Search ...................... 379/53, 54, 94, 219; 358/85; 370/84, 58.2, 58.3

[56] References Cited

U.S. PATENT DOCUMENTS

| | | | |
|---|---|---|---|
| 3,766,324 | 10/1973 | Budrys et al. | 379/54 X |
| 3,997,736 | 12/1976 | Gorman, II | 379/54 X |
| 4,577,312 | 3/1986 | Nash | 370/84 |
| 4,704,716 | 11/1987 | Bowers et al. | 370/58 |
| 4,763,317 | 8/1988 | Leman et al. | 370/58 |

OTHER PUBLICATIONS

J. S. Linnell et al., "New Customer-Controlled DS3 Video Switch", Telephony Magazine, pp. 53–60, Jun. 16, 1986.
Northern Telecom Marketing Bulletins dated Oct. 12, 1989, entitled, "S/DMS AccessNode Residential Fiber Access Applications", Fiber World Wire Central Consolidation, S/DMS TransportNode, S/DMS AccessNode Business Access Applications, S/DMS SuperNode System, S/DMS SuperNode Remote Access in the Fiber World, Fiber World SERVICES, Fiber World Operations, Administration, Maintenance & Provisioning, SONET Overview.
Northern Telecom Product Announcements dated Oct. 1989, entitled, "Northern Telecom Introduces Sonet--Based DMS Supermode Product Family", Northern Telecom Introduces Sonet-Based Fiber Transport System, Northern Telecom Introduces Sonet-Based Fiber Access System, Background Information-The Technology Behind Fiber World.
News Release-Northern Telecom Introduces, "Fiberworld", Family of Fiber Optic Transmission/Switching Products-dated Oct. 12, 1989.
Copies of Slides dated Oct. 10, 1989, entitled "Fiber World".
Copies of Slides dated Oct. 9, 1989, and Oct. 10, 1989, entitled, "The Products", by John Taylor.

Primary Examiner—James L. Dwyer
Attorney, Agent, or Firm—R. T. Watland; P. Visserman

[57] ABSTRACT

Broadband terminals, such as video terminals and a video conferencing system, are directly connected to broadband digital access crossconnect systems and connections between the terminals are established via the crossconnects and DS1 or DS3 interconnecting links under control of telephone exchanges associated with the different crossconnects. A broadband terminal is connected to an associated exchange, as well as, a crossconnect and a connection from one terminal to another may be requested by transmitting a special code to the exchange together with a directory number assigned to the desired broadband terminal. The central office, on the basis of the directory number, area code and exchange code, selects a broadband interconnecting link from the crossconnect to which the originating terminal is connected to the crossconnect to which the terminating terminal is connected. Furthermore, the originating exchange transmits the identity of the selected link and the directory number via a common channel signaling system to the exchange associated with the requested terminal. Both the originating and terminating exchanges transmit connect messages to their associated crossconnects to establish a broadband path between the two terminals.

16 Claims, 6 Drawing Sheets

FIG. 4
CALL ORIGINATION

FIG. 5

FIG. 6
CALL DISCONNECT

METHOD AND APPARATUS FOR PROVIDING REAL-TIME SWITCHING OF HIGH BANDWIDTH TRANSMISSION CHANNELS

FIELD OF THE INVENTION

This invention relates to telecommunication switching systems and more particularly to an arrangement for real-time control of switched high bandwidth circuits interconnecting terminals requiring high bandwidth access.

BACKGROUND OF THE INVENTION

The transmission of high bandwidth signals between widely separated locations is commonly done via special connections to high bandwidth transmission lines which are interconnected to form a direct point-to-point connection from the source to the receiver of video or other high bandwidth signals. One well-known example is the cable television industry, in which a video signal is broadcast via wideband transmission lines to several receivers. Other examples of point-to-point wideband connections are state of the art video teleconferencing facilities and wideband connections between computers. Such direct connections are expensive and great economical advantage can be gained by switched interconnections, allowing any of a number of sources to be connected to any of a number of destinations, as is commonly done in a local exchange for the transmission of narrowband voice signals. One reason that this has not been done for video signals is the lack of wideband facilities which can be readily switched. One prior art approach to this problem is to create a wideband switching facility from a number of narrowband channels. Such an arrangement is taught in the U.S. Pat. No. 4,704,716 entitled "Method and Apparatus for Establishing a Wideband Communication Facility Through a Communication Network Having Narrow Bandwidth Channels". In that arrangement, the wideband facility is comprised of a number of segments, each including a plurality of narrowband time division multiplex channels. Wideband signal data received in a given time frame from one segment is assembled into a single time frame for transmission to another segment. In this manner, a switching system having only narrowband channels is employed to switch wideband signals by disassembling wideband signals, switching them and reassemblying them. A disadvantage of this arrangement is the cost in terms of equipment and real-time in the disassembly and reassembly operations.

Prior art reconfigurable broadband interconnection devices are known. These are standalone systems for interconnecting high bandwidth transmission facilities such as the commonly known DS1 (1.544 Mbps) and DS3 (44.736 Mbps) transmission links. Some crossconnect systems include a digital controller responsive to control messages from the craft personnel or operations systems to reconfigure interconnections between incoming and outgoing high bandwidth transmission links. Once an interconnection has been established in a crossconnect system, however, the transmission links remain connected in the same configuration until an external event occurs such as a link failure or changing traffic conditions, which requires reconfiguration of routes. A disadvantage of this prior art arrangement is that there is no provision for establishing switched connection in real-time on a connection demand basis.

Another prior art arrangement is disclosed in U.S. Pat. No. 4,763,317 entitled "Digital Communication Network Architecture for Providing Universal Information Services". The patent discloses a switched integrated wideband and narrowband multiservices digital network comprising a central switching node with wideband and narrowband switching fabric. The switching fabrics are connected through shared line interface units to wideband optical fiber communication links. Narrowband channels are switched between optical links by means of the narrowband fabric and wideband channels are switched between the optical links by means of the wideband fabric. A disadvantage of this arrangement, is the cost of such an integrated structure, including the cost of special purpose interface circuits. A need exists in the industry for a relatively inexpensive and flexible arrangement for providing services using high bandwidth, such as video conferencing among subscribers, pay-per-view television services, and the like.

SUMMARY OF THE INVENTION

The foregoing problems are solved and a technical advance is achieved in an illustrative telecommunications network in accordance with this invention in which a broadband interconnection device for interconnecting high bandwidth transmission facilities is controlled from a local exchange, on a real-time basis, to selectively establish high bandwidth connections between customer terminals in response to a connection request to the local exchange. In accordance with one aspect of the invention, directory number codes are assigned to terminals requiring high bandwidth interconnecting facilities, such as video terminals, and a high bandwidth transmission route is selected between an originating terminal and a destination terminal using standard call processing route selection routines, based on the assigned directory number codes. In one embodiment of the invention, a network for interconnecting high bandwidth terminals comprises a plurality of high bandwidth crossconnect systems, each controlled from a local exchange. A connection request from a terminal connected to a high bandwidth crossconnect system is transmitted to a local exchange which controls the high bandwidth switch, and the local exchange may select a direct route between its associated high bandwidth switch and another high bandwidth switch to which the desired destination terminal is connected. Alternatively, a path may be found from the originating high bandwidth switch through intermediate high bandwidth switches to the destination switch. The direct or alternate path is selected by the originating exchange and a standard signaling network may be employed to transmit connection information from the originating exchange to the local exchange controlling the high bandwidth switch to which connection is to be made. Connection information for making interconnections in the high bandwidth switches is derived in the local exchange controlling the high bandwidth switch in which the interconnection is to take place, on the basis of line equipment number and selected path identification information. In one specific embodiment of the invention, the directory number assigned to a high bandwidth terminal includes an office code which is the same as that of the local exchange which controls the high bandwidth switch to which the terminal is connected. The office code is used to select an interconnecting link between high bandwidth switches and to transmit connection information between exchanges. Advantageously, by assignment of a standard telephone directory number to a high bandwidth terminal connected to the high bandwidth network, standard call processing facilities available in the telephone exchange controlling a high bandwidth switch and existing interoffice signaling systems, may be used to select and establish interconnecting paths in the high bandwidth network.

In one embodiment of the invention, a connection request is transmitted to a local exchange on a standard telephone line by dialing a code identifying the request as high bandwidth request and the directory number, including area code where applicable, of the high bandwidth terminal to be reached. Alternatively, the request information may be transmitted directly from the terminal to the connected high bandwidth switch and forwarded to the local exchange for analysis and path selection.

In one specific embodiment of the invention, high bandwidth interconnecting links between high bandwidth switches are selected by reference to route and status tables maintained in memory of the controller of the originating local exchange and the high bandwidth switches respond to connect commands from their controlling local exchanges to establish interconnecting paths between specific ports defined by the commands.

BRIEF DESCRIPTION OF THE DRAWING

The invention may be more fully understood from the following detailed description when read with reference to the drawing in which.

DETAILED DESCRIPTION

Figure 1:
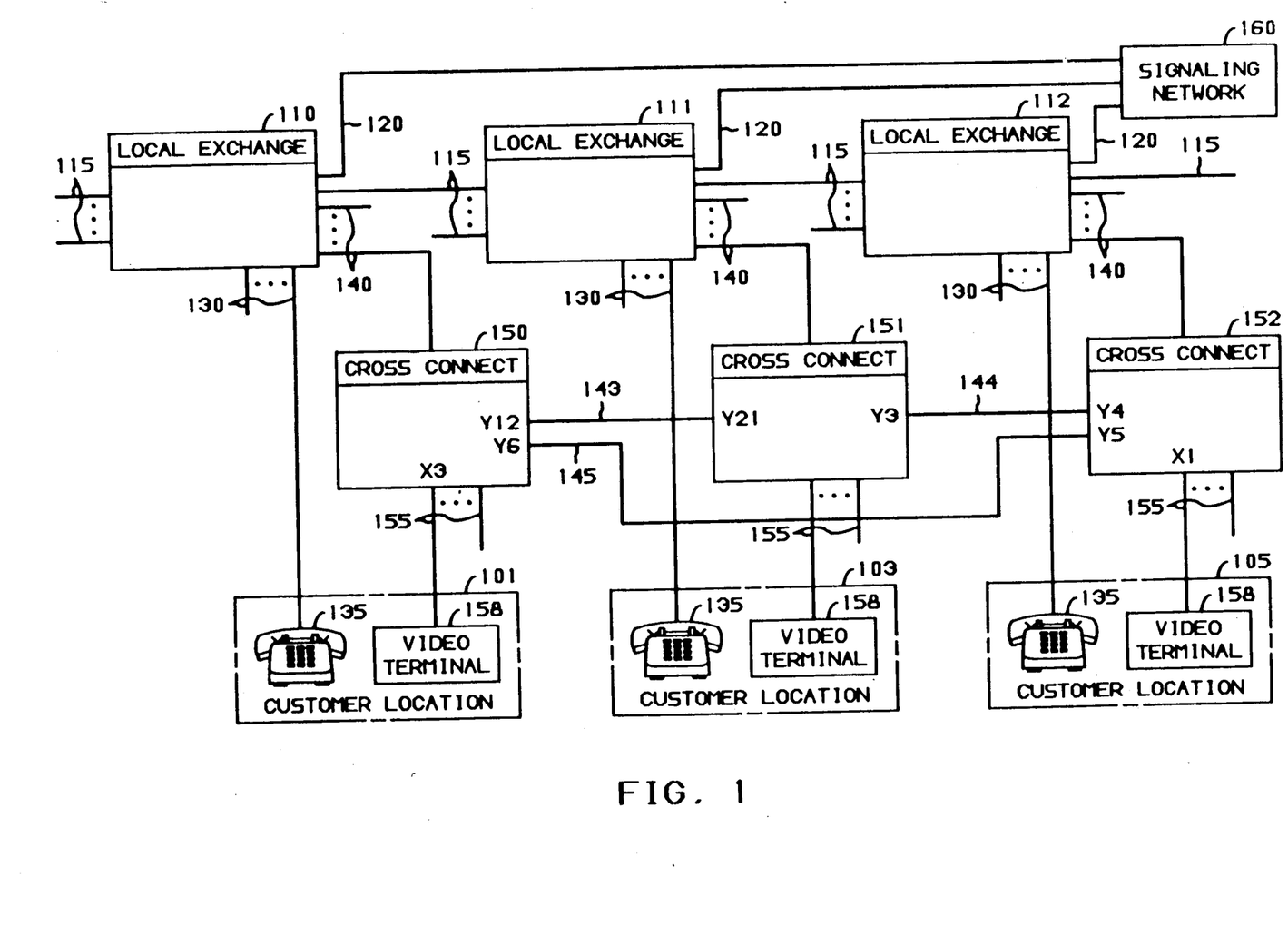
FIG. 1 is a block diagram representation of a system for providing switched high bandwidth interconnections.

FIG. 1 shows a telecommunications network comprising a plurality of local exchanges 110 through 112 each connected to broadband interconnection device, e.g., 150, via a data link 140. The local exchanges 110 through 112 may be any well known telephone exchange switch, and the broadband interconnection devices 150 through 152 may be any well known facilities crossconnect systems. One known local exchange switch is the AT&T 5ESS ® Switch described in the AT&T Technical Journal, July-August 1985, Vol. 64, No. 6, Part 2. Exemplary crossconnect systems are the AT&T DACS III and DACS IV digital access and crossconnect systems, described in publicly available AT&T publications AT&T 365-301-003, "DACS III (Digital Access and Crossconnect System III) Reference Manual" and AT&T 365-301-004 "DACS IV (Digital Access and Crossconnect System IV) Reference Manual". Each of the local exchanges 110 through 112 are connected via data links 120 to a signaling network 160 which may be part of a well known interoffice signaling system such the CCITT Signaling System 7 or common channel interoffice signaling system such as described, for example, in the Bell System Technical Journal, February 1978, Vol. 7, No. 2. In the illustrative system of FIG. 1, each of the local exchanges 110 is connected to customer premises equipment at locations 101, 103 and 105. Each of the customer premises equipment locations has a telephone terminal 135 connected to the local exchange via subscriber lines 130 and a video terminal 158 connected to the corresponding crossconnect system via link 155. The telephone terminal may be an ISDN terminal connected to the local exchange via a well known ISDN basic rate interface subscriber line using ISDN messages, or a standard station, connected via a standard analog line. The video terminal 158 may incorporate a telephone line connection and a key pad, instead of having a separate telephone set 135. Each of the transmission links 155 may be a DS1 (1.544 Mbps) or DS3 (44.736 Mbps) transmission link. DS1 is sometimes referred to as "wideband" and DS3 as "broadband," while standard 64 kilobit voice channels are referred to as narrowband. Herein, the terms "broadband" and "high bandwidth" refer to a bandwidth greater than that of the standard voice channels. The video terminal 158 may be a standard video transmitter/receiver which interfaces with the DS1 or DS3 links in a well known fashion. Alternatively, the terminal may be a data terminal transmitting data at the bit rates compatible with the DS1 or DS3 links. The video terminal may comprise a video camera and a video receiver connected to the transmission link 155 via commercially available video coders, such as the Rembrandt Video System produced by Compression Labs Incorporated, San Jose, Calif. The crossconnect systems 150, 151 and 152 are interconnected via standard high bandwidth DS1 or DS3 links 143, 144 and 145, to form a switched high bandwidth network. The local exchanges 110 are typically interconnected via voice trunks 115 to form a standard voice network. Several broadband terminals 110 may be connected to each crossconnect system via links 155 and to associated local exchanges via lines 130. A broadband connection between broadband terminals, connected to the same or different crossconnect systems may be established by means of a connection request from one of the terminals to the local exchange to which it is connected.

Figure 2:
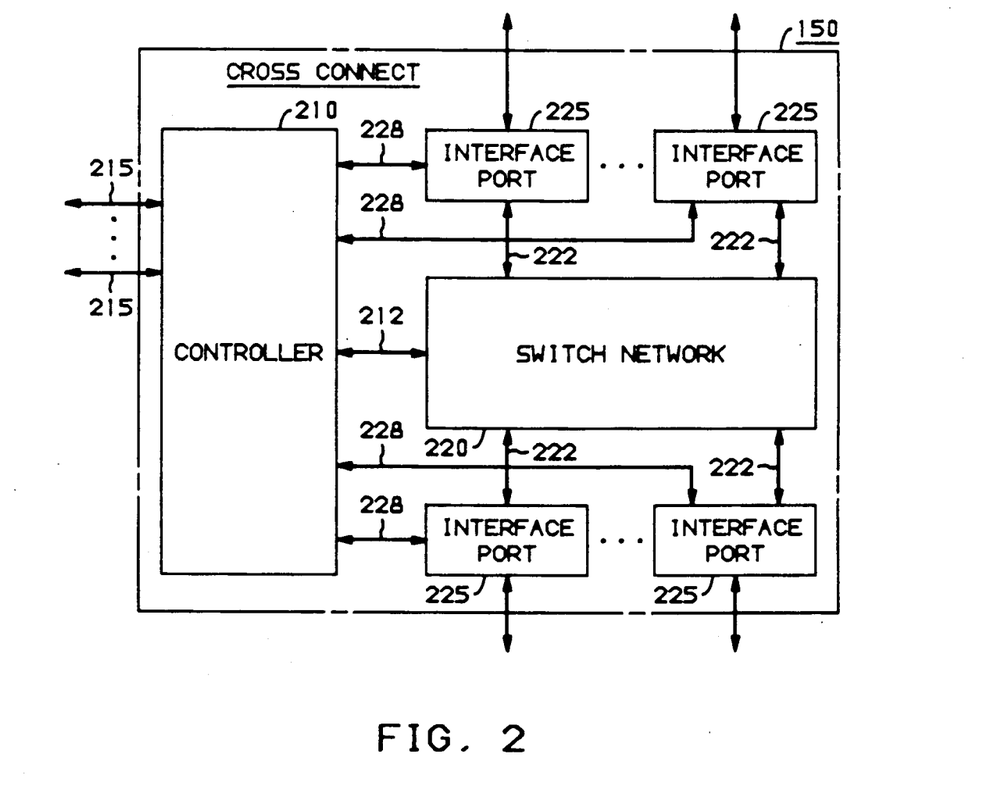
FIG. 2 is a block diagram representation of a digitally controlled crossconnect system for use in the system of FIG. 1.

The crossconnect systems 150, 151 and 152 of FIG. 1 are shown in greater detail in FIG. 2. It includes a controller 210 which may, for example, be the Motorola 68000 processor. The main controller functions primarily to control the network 220 which may be a standard time division switch, controlled in a wellknown fashion, to provide interconnecting paths between selected ones of the interface ports 225. Each of the interface ports is connected to the switch network 220 via links 222 and to a DS1 or a DS3 link. The controller 210 responds to commands, in the form of data messages received via data links 215, to control the switched network to interconnect the various port circuits 225. The controller 210 is directly connected to each of the interface ports 225 via link 228 for the purposes of monitoring and nonoperational control functions such as defining limits for alarms, etc. Link status information is provided to the controller 210 from each of the interface ports 225 and may be used by the controller in communicating interswitch link availability information to the controlling exchange. In the process of establishing a connection between customer terminals, the controlling exchange provides a data message to the controller 210, via one of the data link terminations 215, identifying two links to be interconnected. The controller 210 obtains status information from the ports and provides a nonavailability message to the controlling exchange in case either of the selected ports or data links connected thereto is not available. If the two ports identified by the message from the exchange are available for service, the controller 210 transmits a connect message to the switch network 220 via interconnecting link 212.

Figure 3:
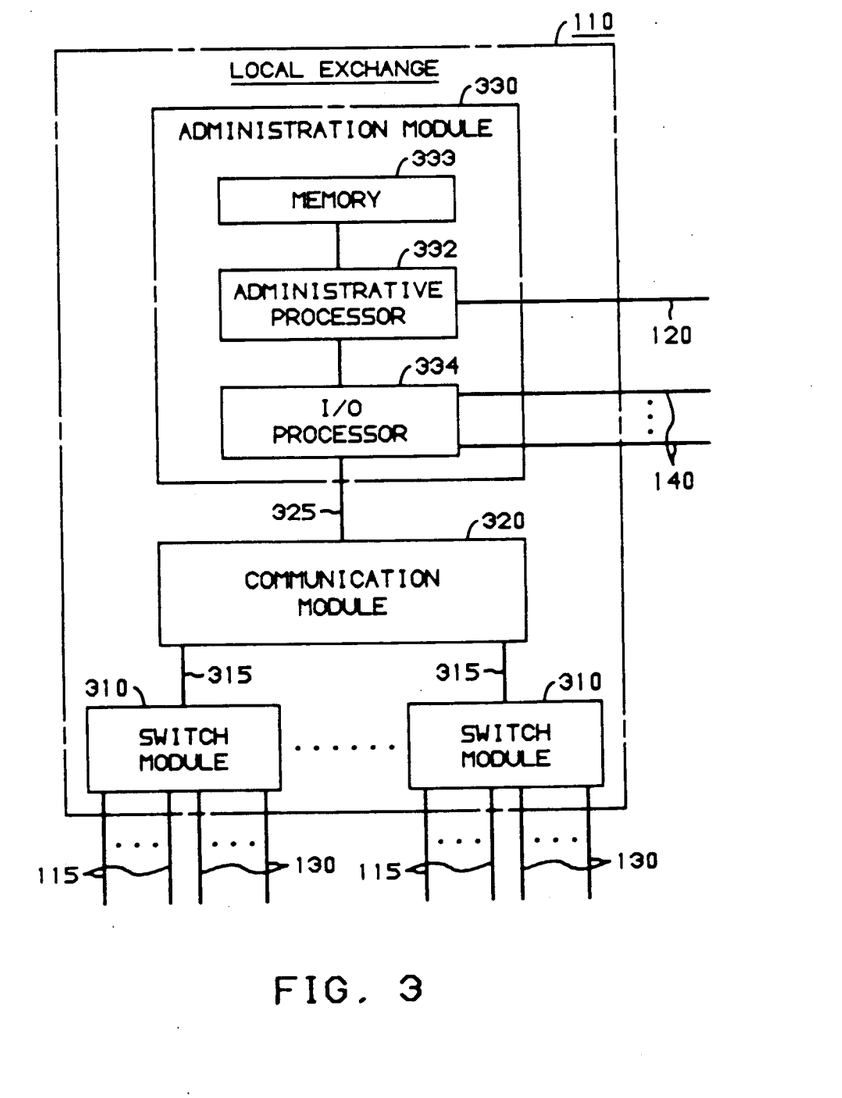
FIG. 3 is a block diagram representation of a telephone exchange for use in the system of FIG. 1.

FIG. 3 is a block diagram representation of the local exchange 110 of FIG. 1. The local exchange may be a distributed switching system such as the aforementioned AT&T 5ESS switch. The illustrative switching system 110 comprises a plurality of switch modules 310 which are connected to subscriber lines 130 and interexchange trunks 115. The function of the switch module 310 is to collect information from lines and trunks and pass that information via links 315 to the communication module 320, and to respond to commands from the communication module 320 to interconnect lines and trunks via a network incorporated in each switch module. The communication module 320 serves primarily to provide a connection among switch modules and between the administrative module 330 and the switch modules 310. It communicates with the administrative module 330 via link 325. In a typical telephone call, called party information is received by one of the switch modules 310 and passed on to the administrative module 330 via the communication module 320. The communication module 320 may include a processor to perform some call processing functions and leave other functions to the administrative module 330. The administrative module may perform digit analysis and other call handling functions and generate commands for the switch modules 310 to establish the desired connections. In the event of interoffice calls, the administrative module 330 communicates with the signaling network 160 via data link 120 to define an appropriate interoffice connection in a well known fashion. The I/O processor 334 is connected to an associated crossconnect system via a data link 140 to transmit control messages to the crossconnect and receive status messages from the crossconnect.

Figure 4:
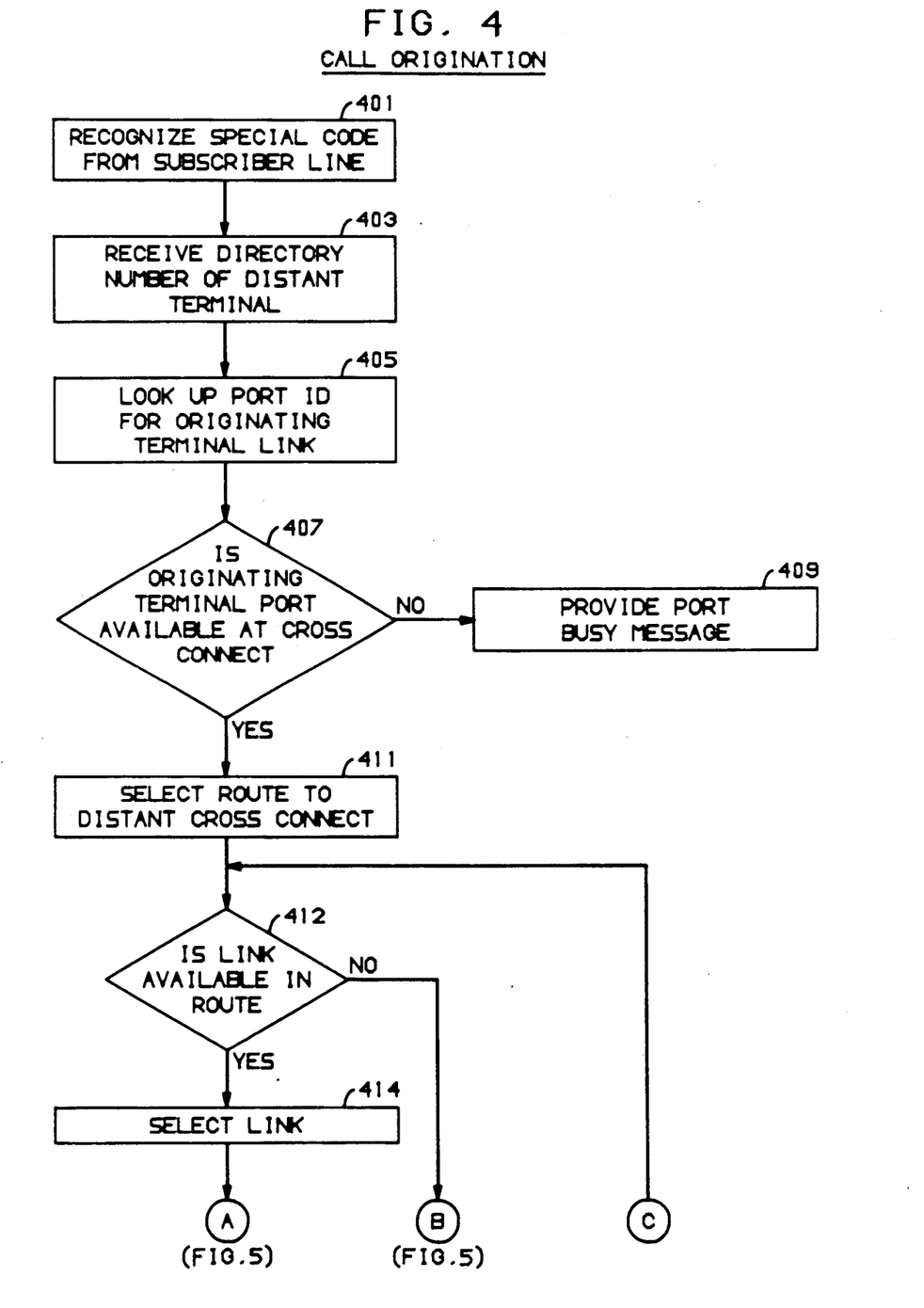
FIGS. 4 through 6 are flowchart representations of functions performed in the local exchange of FIG. 3.
Figure 5:
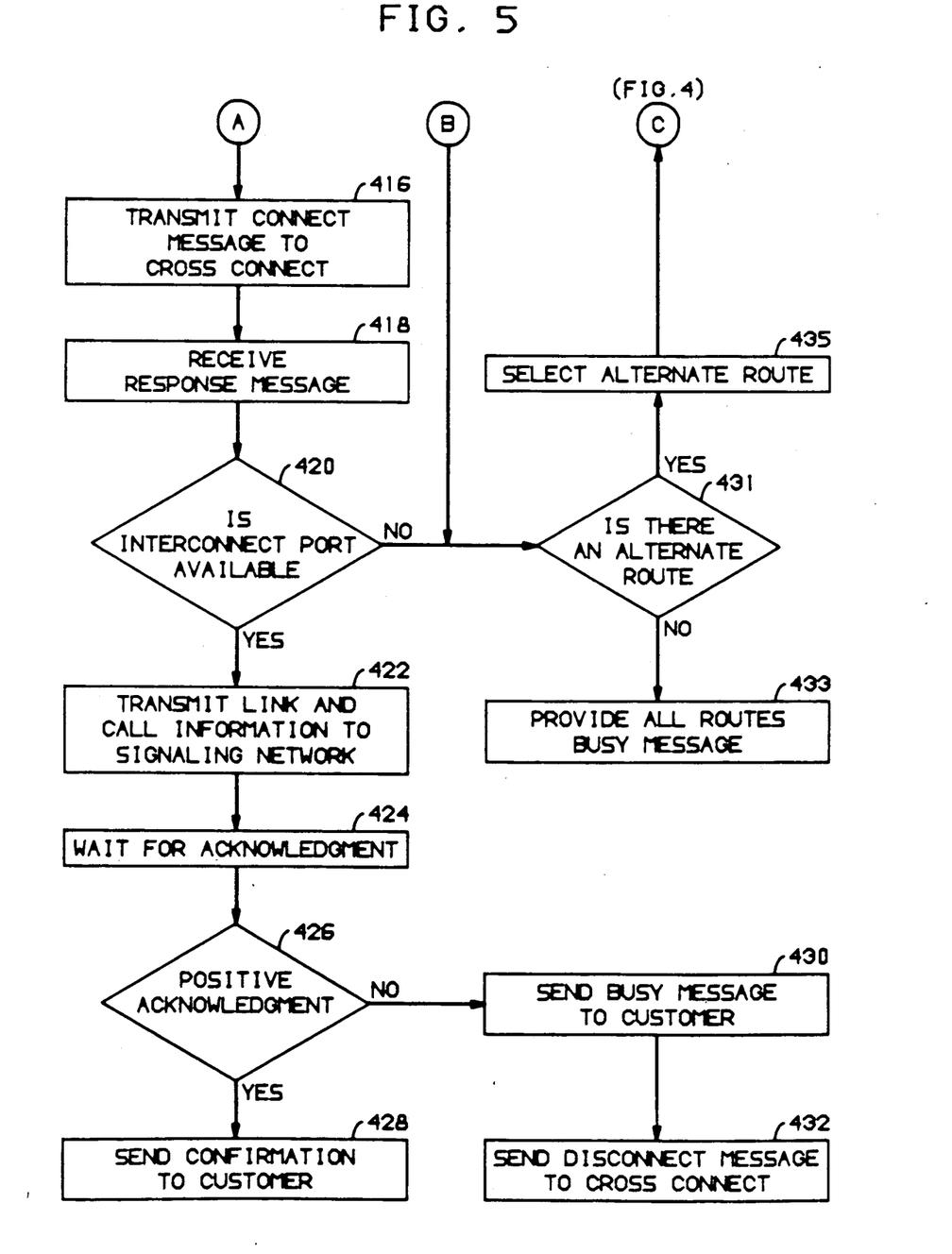

FIG. 4 is a flow chart of activity taking place in the originating local exchange in the process of interconnecting two video terminals 158 connected to two different crossconnect systems 150. In a typical scenario, a customer at a customer's location 101 wishes to establish a connection between a video terminal 158 at customer location 101 and a video terminal 158 at customer location 105. In the present arrangement, telephone directory numbers are assigned to the video terminal 158 at each location. The establishment of a connection between two video terminals is initiated by the originating party e.g., location 101, dialing a special code from the telephone set 135 at location 101, for example, *T1 followed by a 7- or 10-digit directory number, depending on whether the video terminal to be reached is or is not in the same calling area. One of the switch modules 310 recognizes the *T1 code as a request for a connection involving the crossconnect systems 150, as indicated in block 401 of the flow chart of FIG. 4. The directory number dialed by the customer is passed, via the communication modules 320, to the administrative module 330. It is feasible to control both DS1 and DS3 facilities available to a customer. DS1 and DS3 crossconnect systems may then be controlled from the same exchange. If both DS1 and DS3 facilities are available to the subscriber, one code, e.g., *T1, may be used to designate that DS1 facilities are to be used and another, e.g., *T3, may be used to designate DS3 facilities. As an alternative to using a separate telephone line, origination request information may be transmitted to the exchange by a data channel embedded in the broadband link from the terminal to the crossconnect system. The request information is passed from the crossconnect to the exchange, for example to the administrative module 330, for processing in the same manner.

Block 403 of FIG. 4 indicates the receipt of the directory number of the distant terminal by the administrative processor 332. The switch module 310 further will provide information identifying the equipment number of the originating telephone terminal at location 101. This equipment number is translated by the administrative module into a port number identifying the port of the crossconnect system 150 connected to the link 155 to the associated originating video terminal 158 at location 101. Tables providing information relating subscriber equipment number and data pertaining thereto are commonly used in telephone systems. Table 1 represents a portion of such a table showing exemplary equipment number and port identifier. The step of looking up the port ID for the originating terminal link is indicated in block 405 of FIG. 4. The next function to be performed by the administrative processor 332 is to determine whether a path is available from the originating crossconnect system 150, connected to the originating terminal, to the terminating crossconnect system 152, connected to the destination video terminal defined by the directory number received in block 403. Prior to searching for a route between the two crossconnect systems, a test is made in block 407 to determine whether the port associated with the originating terminal is available at the crossconnect system. This preliminary test is made by means of a status request message from the I/O processor 334 (FIG. 3) to the crossconnect system controller 210 (FIG. 2). If the port is unavailable for any reason, a busy message is provided to the caller and the call is terminated as indicated in block 409. If the originating terminal port is available, an advance is made to block 411 to select a route to the distant crossconnect system. Telephone exchanges commonly have the capability to select a route to any distant office identified by office code, or area code and office code if outside of the same calling area. By the assignment of a standard telephone number, including area code and office code to the video terminals 158, a standard route selection process can be used to select a broadband route from one video terminal connected to a crossconnect system controlled by a first local exchange to a video terminal connected to a crossconnect system controlled by a second local exchange.

By way of example, a video call from the customer premises at location 101, connected to local exchange 110 may be extended to the video terminal 158 at location 105 associated with local exchange 112. The code transmitted by the originating station 101 and received at the local exchange 110 includes the telephone number associated with video terminal 158 at location 105, as described above. A route selection is made in local exchange 110 by means of a standard call processing software which includes a digit analysis program which interprets the telephone number of the destination video terminal. Such call processing software, including a digit analysis program are well known in the industry. A description of such software may be found in the Bell System Technical Journal, Vol. XLIII, September 1964, No. 5, Part 2. Typically, the digit analysis program will generate a route group index based on the identity of the called number and other information pertaining to the call type, which in this case is identified by the special code transmitted by the customer. The route group index is used in accessing a routing table, such as for example shown in Table 2. This table and other translation tables are customarily stored in the memory 333, in the exchange. Alternatively, routing tables may be stored in a centralized database, accessible via signaling network 160. The routing table defines first preferred and alternate routes to the destination. In this case, the routes are DS1 or DS3 links interconnecting high bandwidth crossconnect systems. By way of example, if the route group index generated by the digit analysis program is equal to 100, the first preferred route is route 10. Route 10 may, for example be the direct route represented by link 145 in FIG. 1, which extends between ports Y6 (FIG. 1) of crossconnect system 150 and Y5 (FIG. 1) of crossconnect system 152. The alternate route 20 indicated in Table 2 may, for example be link 143 between port Y12 (FIG. 1) of crossconnect system 150 and port Y21 (FIG. 1) of crossconnect system 151. If the latter were chosen, a route selection routine has to be executed in the local exchange 111 which controls crossconnect 151 to, for example find the link 144 extending between port Y3 (FIG. 1) of crossconnect 151 and port Y4 (FIG. 1) of crossconnect 152. The step of selecting the appropriate route is shown in block 411 of FIG. 4. A selected route may consist of several high bandwidth links between switches, depending on anticipated traffic, and a determination is made in block 412 of FIG. 4 to determine if there is an available link in the chosen route. That determination may be made with respect to a link busy idle table as shown, for example in Table 3. A zero in the table indicates that the link is available. Selection of the link is shown in block 414. The link may be selected in accordance with a well-known algorithm to distribute traffic among links if several links are available. In order to keep the link busy idle table updated, a '1' is entered in the appropriate location when a link is selected and a '0' is entered when a link is released. A message is transmitted to the crossconnect, as shown in block 416 commanding the controller 210 of crossconnect system 150 to establish a connection through the switch network 212 between port X3 (FIG. 1) connected to the video terminal 158 of location 101 and port Y6 (FIG. 1) if the direct route comprising interconnecting links 145 has been chosen. The information as to the identity of the port connected to premises location 101 was derived in block 405 from Table 1. The port associated with the link selected in block 414 is obtainable from Table 4. For example, link 10-1 is connected to port Y6. The connect message from the exchange to the crossconnect controller may, for example, take the format shown in Table 5, indicating to the controller 210 that this is a digital crossconnect message of DS1 links, the message is directed to crossconnect system 150, and that the connection is to be made from port X3 to port Y6. The message is transmitted from the input/output processor 334 (FIG. 3) via data link 140. The controller 210 of crossconnect system 150 may provide a response message to the local exchange 110 indicating whether or not the port for the selected interswitch link is available. A test of the response message is made in block 420 to determine whether the interconnect port is available. If so, an advance is made in block 422 and the identification the link selected in the block 414 and called directory number identifying the destination video terminal, is transmitted to the signaling network 160 via data link 120. The signaling network 160 will transmit the information to the exchange identified by the directory number, for example local exchange 112 which controls the crossconnect system 152. Within the local exchange 112 a connect message is formulated for establishing the desired connection in the crossconnect system 152. In this example, the information in the signaling message received from the signaling network 160 includes the identity of the interconnecting link 145 selected by the local exchange 110. Data in the local exchange 112 for example in the form on Table 7, will provide the identity of the port Y5 of the crossconnect 152. The telephone number associated with video terminal 158 on customer premise location 105 is also included in the signaling message. The telephone number is readily converted in a standard fashion to a port number by means of data stored in the exchange 112, as shown in Table 6. For this table, it may be determined in local exchange 112 that port X1 of crossconnect system 152 connects to the identified terminal. In the event that for any reason the connection cannot be established between the desired terminals, in this example Y5 and X1 of crossconnect 152, the local exchange 112 transmits a standard busy message to local exchange 110 via the signaling network 160.

After transmitting route and call information to signaling network 160, the local exchange 110 waits for an acknowledgement as indicated in block 424. In the event of a positive acknowledgement from the other exchange, i.e., exchange 112 in this example, a confirmation message is sent to the customer as indicated in block 428. If a negative acknowledge is received, a busy message is sent to the customer as indicated in block 430. Thereafter, a disconnect message is sent to the crossconnect system 150 to terminate the connection. The disconnect message is analogous to the connect message shown in Table 5, indicating a disconnect rather than a connect. The crossconnect 150 will act upon the message by taking down the established connection.

Returning to decision block 412 (FIG. 4), in the event that it is found in examination of the link busy idle table, Table 3, that there is no available link, a test is made in decision block 431 to determine whether an alternate route is designated in the route table, Table 2. In this example, an alternate route is route 20 which may include the links 143 between crossconnect 150 and 151. If the test is block 431 indicates that there is no further alternate route, an all-routes busy message as provided to the subscriber as indicated in block 433. If there is an alternate route, a route is selected as indicated in block 435 and the links of the newly selected route are tested for availability in block 412 and the subsequent sequence is executed in the manner described earlier herein. Returning to block 420, if it is determined after having received a response message from the crossconnect system in block 418, that the selected interconnect port is not in fact available, a transfer is made to decision block 431. It is again determined whether or not an alternate route is available and the sequence outlined above. After the request for connect message has been transmitted on the subscriber line, the telephone set may return to the on-hook state and a normal disconnect sequence will be executed by the switch module. An additional step, not shown in the flow chart, may be executed in the administrative module 330 to effect the subscriber line disconnect if the line is not returned to the on-hook state by the customer. Alternatively, the subscriber line connection may be left up until the high bandwidth connection is terminated.

Figure 6:
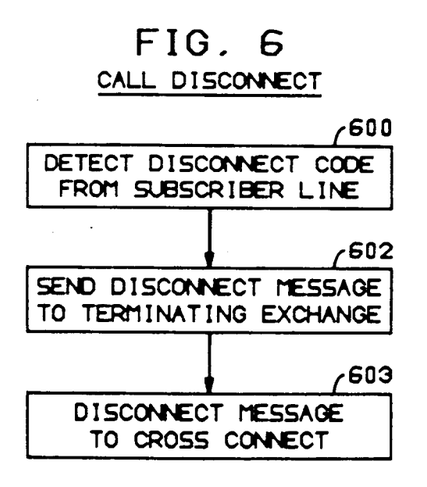

When a high bandwidth connection is to be terminated, either the calling or called party terminal may transmit a disconnect code. The disconnect sequence is shown in flow chart form in FIG. 6. Block 600 refers to receiving the disconnect code on the subscriber line from the associated telephone terminal a the originating exchange. As described earlier, the subscriber line is connected to one of the switching modules 310 (FIG. 3) in the local exchange 110. The disconnect code is transmitted from the switch module to the administrative module 330 together with equipment number information identifying the subscriber line. This information is used by the program in the administrative module to access standard call processing tables or processes where the details of the call are recorded. Examination of the recorded information will provide the identity of the crossconnect system, the identity of the crossconnect ports involved in the call, the identity of the interconnecting link between crossconnects, and the area and office code of the terminating exchange. As indicated in block 602 of FIG. 6, a disconnect message is sent to the terminating exchange via the signaling network 160 and a disconnect message is sent to the crossconnect system 150 via data link 140, to cause the port connected to the video terminal, X3 in this example, to be disconnected from the port Y6, in this example, connected to the interswitch link 145. If the call is disconnected by the terminating customer, the sequence of steps outlined in FIG. 6 are executed in the terminating exchange.

The above description is with reference to a broadband connection between broadband terminals connected to different crossconnect systems controlled by different local exchanges. The same principles are applicable for a connection between broadband terminals connected to the same crossconnect system with the exception of the selection of a path between crossconnect system and the transmission of information to a distant exchange. In that case the local exchange transmits a message to the associated crossconnect to establish a path between the two identified terminals.

It is to be understood that the above-described arrangement is merely an illustrative application of the principles of the invention numerous other arrangements may be devised by those skilled in the art without departing from the spirit and scope of the invention.

TABLE 1

| EQUIP. NO. | XC PORT |
|---|---|
| A0Z3 | X3 |

TABLE 2

| RGI | F | ALT | ALT |
|---|---|---|---|
| 100 | 10 | 20 | — |

TABLE 3

| LINK | | B/I | |
|---|---|---|---|
| 10-1 | 10-2 | 20-1 | 20-2 |
| 0 | 0 | 0 | 1 |

TABLE 4

| LINK | PORT |
|---|---|
| 10-1 | Y6 |
| 10-2 | YY |
| 20-1 | Y12 |
| 20-2 | YN |

TABLE 5

| CONNECT MESSAGE |
|---|
| CONN-DSX-T1:150:X3:Y6 |

TABLE 6

| DIRECTORY NO. | XC PORT |
|---|---|
| AAAA | X1 |

TABLE 7

| LINK NO. | XC PORT |
|---|---|
| NN | Y5 |

We claim:

1. In a telecommunications system, an arrangement for providing a real-time switched broadband connection between broadband terminals, comprising:
   at least one telephone exchange;
   a broadband interconnection device connected to said exchange by a communication means for transmitting data messages, and responsive to control commands in said data messages for selectively interconnecting broadband transmission links;
   means for transmitting to said exchange a connection request message from a first broadband terminal connected to said device via a first broadband link;
   said exchange responsive to a connection request from said first terminal defining a second terminal connected to said device via a second broadband link, for transmitting to said device via said communication means a data message including a control command defining said first and second links;
   said interconnection device responsive to said control command for establishing a path between said first and said second links.

2. In a telecommunications system, an arrangement for providing a switched broadband connection, comprising:
   at least one telephone exchange;
   at least one broadband interconnection device;
   means for transmitting to said exchange a connection request message from a broadband terminal connected to said device; and
   means for communicating data messages including control commands from said exchange to said device;
   said device comprising terminal ports for connection to broadband terminals, link ports for connection to broadband interconnection links to other broadband interconnection devices and port interconnection means responsive to control commands for selectively establishing interconnecting paths between ports defined by said control commands;
   said exchange responsive to a connection request from a terminal connected to one of said terminal ports, for selecting one of said link ports for connection to another interconnection device and for transmitting via said transmitting means to said at least one device a data message including a control command defining said one of said terminal ports and said selected one of said link ports;

said port interconnection means responsive to said control command for establishing a path from said one of said terminal ports to said selected one of said link ports;

whereby a telephone exchange connected to a broadband interconnection device is responsive to a request from a broadband terminal connected to said connected device via said data message to select an interswitch link between broadband interconnection devices and to control the connected device to establish the required connections to the selected link.

3. The arrangement in accordance with claim 2 wherein said exchange has a plurality of subscriber lines connected thereto and said means for transmitting comprises one of said subscriber lines.

4. The arrangement in accordance with claim 2 and further comprising an additional exchange and an additional broadband interconnection device connected to said additional exchange;

means for transmitting data messages including control commands from said additional exchange to said additional device;

said additional device comprising a terminal port for connection to a broadband terminal and a link port for connection to a broadband link interconnecting said at least one device and said additional device and port interconnection means responsive to said data messages including control commands for selectively establishing an interconnecting path between said terminal port of said additional device and said link port of said additional device; and wherein said at least one exchange is further responsive to said connection request to transmit to said additional exchange information defining said selected link and terminal identity information defined by said request message, to said additional exchange;

said additional exchange responsive to said information transmitted by said at least one exchange to transmit to said additional device one of said data messages including a connect command identifying said terminal port of said additional device and said link port of said additional device; and said port interconnection means of said additional device responsive to said connect command from said additional exchange to establish an interconnecting path between said terminal port of said additional device and said link port of said additional device.

5. The arrangement in accordance with claim 4 and further comprising a signaling interconnection system for interconnecting said at least one exchange and said additional exchange and wherein said at least one exchange transmits said information defining said selected link and said terminal identity information to said additional exchange via said signaling system.

6. The arrangement in accordance with claim 5 further comprising originating and terminating terminal equipment and broadband data links connecting said originating and terminating terminal equipment to said at least one and said additional devices, respectively;

said originating terminal equipment further comprising signaling means for connection to said at least one exchange for transmitting said connection request to said at least one exchange.

7. The arrangement in accordance with claim 6, wherein said signaling means in said originating terminal equipment comprises a subscriber line connected to said at least one exchange and means for transmitting a special code signifying a request for broadband services to said at least one exchange.

8. In a telecommunications system, an arrangement for providing a switched broadband connection, comprising:

at least one telephone exchange;

at least one broadband interconnection device;

means for transmitting to said exchange a connection request message from a broadband terminal connected to said device; and means for transmitting control commands from said exchange to said device;

said device comprising terminal ports for connection to broadband terminals, link ports for connection to broadband interconnection links to other broadband interconnection devices and port interconnection means responsive to control commands for selectively establishing interconnecting paths between ports defined by said control commands;

said exchange responsive to a connection request from a terminal connected to one of said terminal ports, for selecting one of said link ports for connection to another interconnection device and for transmitting to said at least one device a control command defining said one of said terminal ports and said selected one of said link ports;

said port interconnection means responsive to said control command for establishing a path from said one of said terminal ports to said selected one of said link ports;

said at least one exchange comprises memory means for storing data defining the identity of one or more interconnecting links interconnecting said at least one device and said additional device, and processor means responsive to a connection request from said terminal connected to said one port including a directory number defining a destination terminal and including a code identifying said additional exchange, to select on the basis of said code identifying said additional exchange an interconnecting link between said at least one device and said additional device from links identified by data stored in said memory means and for including at least one part of said directory number in said information transmitted to said additional exchange;

an additional exchange and an additional broadband interconnection device connected to said additional exchange;

said additional exchange comprising memory means for storing data defining a terminal port in association with said at least one part of directory number and a link port associated with said information defining said selected link, and processor means responsive to said information transmitted to said additional exchange to transmit to said additional device a connect message including data defining said terminal port and said link port identified by data in said memory means of said additional exchange;

said additional device comprising a terminal port for connection to a broadband terminal and a link port for connection to a broadband link interconnecting said at least one device and said additional device and port interconnection means responsive to control commands for selectively establishing an interconnecting path between said terminal port of said additional device and said link port of said additional device; and wherein said at least one exchange is further responsive to said connection request to transmit to said additional exchange information defining said selected link and terminal identity information defined by said request message, to said additional exchange;

said additional exchange responsive to said information transmitted by said at least one exchange to transmit to said additional device a connect command identifying said terminal port of said additional device and said link port of said additional device; and said port interconnection means of said additional device responsive to said connect command from said additional exchange to establish an interconnecting path between said terminal port of said additional device and said link port of said additional device;

whereby a telephone exchange connected to a broadband interconnection device is responsive to a request from a broadband terminal connected to said connected device to select an interswitch link between broadband interconnection devices and to control the connected device to establish the required connections to the selected link.

9. An arrangement for establishing a real-time switched connection among broadband terminals, comprising:

a first and a second telephone exchange;

signaling transmission means interconnecting said first and said second telephone exchanges;

a first and a second broadband crossconnect system, each for establishing broadband paths between interconnecting broadband links;

a first data link for transmission of data messages including control information between said first exchange and said first crossconnect system;

a second data link for transmission of data messages including control information between said second exchange and said second crossconnect system;

first and second video terminals connected via broadband terminal links to said first and said second crossconnect systems, respectively, and each having an assigned directory number;

a plurality of broadband interconnecting links interconnecting said first and said second crossconnect systems;

a customer telephone terminal associated with said first broadband terminal and connected to said first exchange;

said first telephone exchange responsive to a connection request from said customer telephone terminal including a directory number identifying said second broadband terminal, to select one of said interconnecting links for the transmission of broadband signals between said first and said second crossconnect systems and to transmit to said second exchange via said signaling transmission means, connection information including codes defining said directory number and said selected link;

said first exchange further responsive to said connection request for transmitting at least one of said data messages including control information to said first crossconnect system for controlling said first crossconnect system to establish a broadband interconnecting path between said first broadband terminal and said selected link; and said second exchange responsive to said connection information to transmit to said second crossconnect system at least one of said data messages including control information for controlling said second crossconnect system to establish a broadband interconnecting path between said selected link and said second broadband terminal.

10. A telecommunication system comprising:

a plurality of interconnected telephone exchanges;

a plurality of broadband switches each having terminal ports for connection to broadband terminals and link ports for connection to links interconnecting said switches;

one of said switches connected by a data link to one of said exchanges and responsive to data messages including control commands from said one exchange for establishing interconnections among ones of said terminal ports and said link ports and another of said switches connected by another data link to another of said exchanges and responsive to data messages including control commands from said other exchange for establishing connections among said terminal ports and said link ports;

said one exchange responsive to a connection request from a terminal connected to one of said terminal ports of said one switch defining a terminal connected to one of said terminal ports of said other switch, by sending one of said data messages including a control command to said one switch to interconnect said one of said terminal ports of said one switch and a selected one of said interconnecting links and for transmitting to said other exchange information representing a request for interconnection of said selected interconnection link and said defined terminal;

said other exchange responsive to said information by sending one of said data messages including a control command to said other switch to interconnect said selected interconnection link and said defined terminal.

11. In a telecommunication system comprising a plurality of telephone exchanges and a plurality of broadband interconnection devices interconnected by a plurality of broadband transmission links, and each of said devices connected to at least one of said exchanges by a data bus, a method of completing a connection between broadband terminals connected to said devices comprising the steps of:

receiving a connection request at a first one of said exchanges from a first terminal connected to a first one of said devices, representing a request for interconnection of said one terminal and a second terminal defined in said request and connected to a second one of said devices;

in response to said connection request, selecting in said first exchange an interconnecting link interconnecting said first and said second devices;

transmitting information identifying said second terminal and said selected link from said first to said second exchange;

transmitting a data message including a connect command from said first exchange to said first device defining connections to said first terminal and to said selected interconnecting link;

transmitting a data message including a connect command from said second exchange to said second device defining connections to said second terminal and said interconnecting link; and establishing an interconnecting path between said first terminal and said selected interconnecting link in said first device and establishing an interconnecting path between said selected interconnecting link and said second terminal in said second device responsive to said data messages.

12. The method in accordance with claim 11 wherein said step of selecting includes executing in said first exchange the step of choosing a first link from a plurality of interconnecting links between said first and said second devices and the step of determining the availability of the first chosen link and choosing an alternate link if the first chosen link is not available.

13. In a telecommunication system comprising a plurality of telephone exchanges and a plurality of broadband interconnection devices interconnected by a plurality of broadband transmission links, and each of said devices connected to at least one of said exchanges, a method of completing a connection between broadband terminals connected to said devices comprising the steps of:

storing in said exchange data defining the availability of interconnecting links from said first device to said second device;

receiving a connection request at a first one of said exchanges from a first terminal connected to a first one of said devices, representing a request for interconnection of said one terminal;

transmitting information identifying said second terminal and said selected link from said first to said second exchange;

transmitting a connect command from said first exchange to said first device defining connections to said first terminal and to said selected interconnecting link;

transmitting a connect command from said second exchange to said second device defining connections to said second terminal and said interconnecting link; and establishing an interconnecting path between said first terminal and said selected interconnecting link in said first device and establishing an interconnecting path between said selected interconnecting link and said second terminal in said second device, and a second terminal defined in said request and connected to a second one of said devices;

in response to said connection request, selecting in said first exchange an interconnecting link interconnecting said first and second devices, said selecting step including executing in said first exchange the step of choosing a first link from a plurality of interconnecting links between said first and second devices and determining the availability of the first chosen link and choosing an alternate link if the first chosen link is not available by reading said table to determine availability of individual links of said plurality of interconnecting links; and updating said table each time a link is selected.

14. The method in accordance with claim 11 wherein the method, before the step of receiving a connection request, includes the step of transmitting from said first terminal to said first exchange a connection request message including information identifying said second terminal and said second exchange, and wherein said step of selecting comprises selecting an interconnecting link on the basis of said information identifying said second exchange and said step of transmitting information from said first to said second exchange includes transmitting a message via an interexchange signaling network wherein the address associated with the message corresponds to said information identifying said second exchange.

15. The method in accordance with claim 11 wherein said step of transmitting a connect command from said first exchange to said first device is executed prior to the step of transmitting the information from said first to said second exchange and further includes the step of transmitting a response message from said first device to said first exchange and repeating the step of selecting an interconnecting link if the response message indicates that a previously selected link is unavailable.

16. A telecommunication exchange comprising:

control signal receiving means for receiving a connection request from a broadband terminal;

control signal transmission means for transmitting a connection command to at least one broadband interconnection device, said interconnection device for interconnecting broadband transmission links;

signaling means for connection to other exchanges;

memory means for storing data defining relations between broadband terminal identifications codes and codes defining broadband terminal connections to a broadband interconnection device and for storing data defining broadband interconnecting links interconnecting a plurality of broadband interconnection devices;

control means responsive to a connection request received on said control signal receiving means from one broadband terminal connected to said at least one broadband interconnection device and defining a code signifying a request for broadband services and a code specifying a directory number for another broadband terminal, including an exchange code designating a telecommunication exchange associated with said other broadband terminal, for selecting an interconnecting link between said at least one interconnection device and an interconnection device associated with said other broadband terminal, based on said data defining said relations and interconnecting links, and for transmitting said directory number and information identifying said selected interconnecting link to said exchange associated with said other broadband terminal via said signaling means;

said control means further responsive to said connection request to transmit to said at least one interconnection device, via said control signal transmission means, a connection command identifying said one terminal and said selected link and instructing said at least one interconnection device to interconnect said one terminal and said selected link.

* * * * *